July 10, 1945.  W. H. HARSTICK  2,380,308
CLUTCH
Filed May 12, 1943
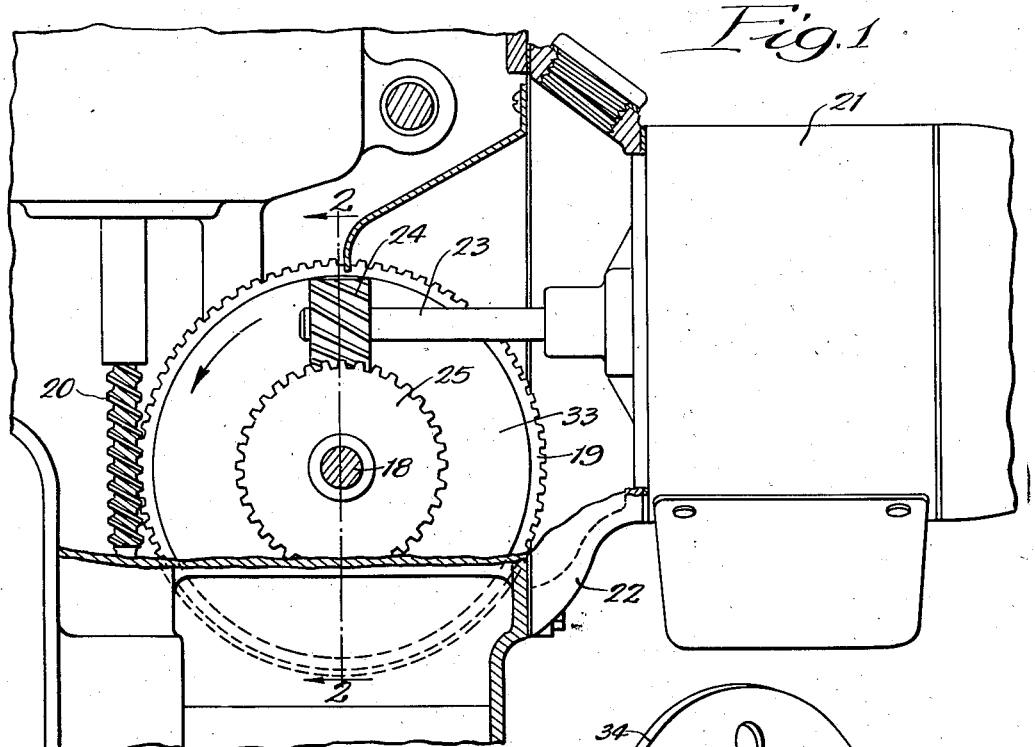
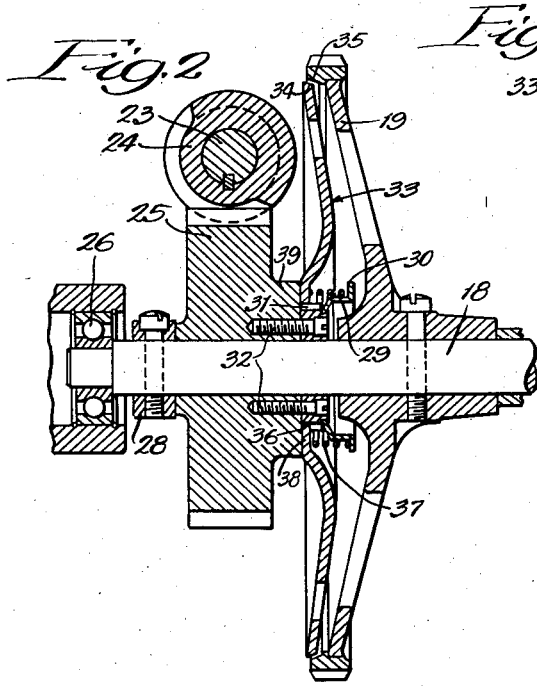
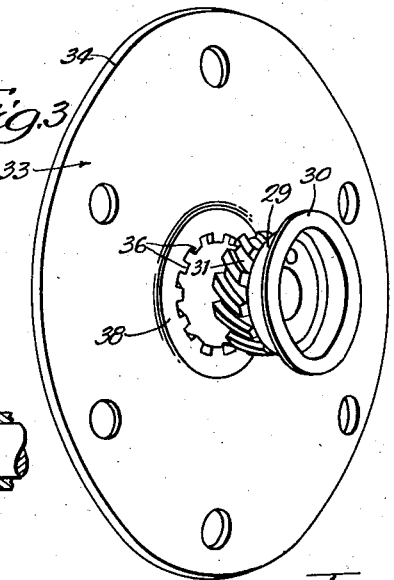
Inventor:
William H. Harstick,
By Paul O. Pippel
Attorney.

Patented July 10, 1945

2,380,308

UNITED STATES PATENT OFFICE 2,380,308

CLUTCH

William H. Harstick, Richmond, Ind., assignor to International Harvester Company, a corporation of New Jersey Application May 12, 1943, Serial No. 486,646

5 Claims. (Cl. 74—407)

This invention relates to a new and improved clutch and is an improvement over the clutch shown in my prior Patent 2,252,373.

The clutch of this invention relates specifically to a motor drive for a cream separator or any other motor-driven device wherein it is desired to cause immediate disengagement of the power when the motor or other source of power supply is stopped. Numerous clutches of this type have been manufactured in the past, but the majority of them failed to operate as efficiently as desired.

An important object of this invention is to provide an improved clutch for a cream separator.

It is a particular object of this invention to provide a friction-engaging clutch member adapted to have a variable yieldable source of power wherein initial engagement of the clutch member will have sufficient force to overcome the inertia of the member to be driven.

Other and further important objects of this invention will become apparent from the disclosures in the following specification and accompanying drawing, in which:

Figure 1 is a sectional view of a portion of a cream separator;

Figure 2 is a sectional view taken on the line 2—2 of Figure 1; and

Figure 3 is a perspective of the clutch plate and associated spiral tooth clutch in exploded relationship.

As shown in the drawing, an electric motor 21 is secured by means of a bracket 22 to the base of a cream separator. A shaft 23 projects from the motor and has a spiral gear 24 secured to its end in mesh with a spiral gear 25 mounted upon a shaft 18. The shaft 18 is carried in ball bearings 26. An adjustable collar 28 is secured to the shaft 18 at one end thereof. The spiral gear 25 is adapted to abut the collar 28 when not driven. Immediately upon actuation of the motor 21, the spiral gear 24 causes the spiral gear 25 to rotate, and by reason of the cooperation of the spiral gears, the gear 25 is caused to shift laterally in a rightward direction. A projecting sleeve member 29 having an outwardly extending end flange 30 and external spiral teeth 31 along its body portion is affixed to the spiral gear member 25 by threaded pins or the like 32. The spiral teeth 31 on the sleeve 29 are thereby driven as a unit with the gear member 25. A clutch plate 33 having an outer tapered periphery 34, which is adapted to frictionally engage a beveled under surface 35 of a gear 19, is equipped at its hub portion with internal spiral teeth 36 for engagement with the external spiral teeth 31 on the projecting sleeve 29. The spiral teeth 31 and 36 are in mesh at all times, whether or not the gear 25 is driven. A spring 37 is adapted to be positioned intermediate the end flange 30 of the sleeve 29 and the hub portion 38 of the clutch plate 33. This spring 37 acts to normally maintain the device, as shown in Figure 2, or, in other words, the clutch plate 33 and its integral hub 38 abut a projecting shoulder 39 on the gear 25.

In operation the gear 25, as previously mentioned, is shifted laterally in a direction toward the gear 19 to be driven, and upon such occurrence the clutch plate 33 is likewise shifted laterally so that the peripheral edge 34 thereof frictionally engages the beveled under surface 35 of the gear 19 so that ordinarily the gear 25 will cause immediate rotation of the gear 19 and the spindle 20 meshing therewith for driving a cream separator bowl or the like. However, the gear 19 may possess sufficient inertia to require an excessive force to be overcome and cause the gear to rotate. At any rate the gear 19 accelerates very slowly while gears 24 and 25 continue to rotate at a faster rate. Without means for supplying additional force, the frictional engagement between the surfaces 34 and 35 will tend to slip, and the gear 19 will not have its inertia overcome. The means for supplying this additional force takes the form of a spiral toothed clutch connection, namely, the spiral teeth 31 engaging the spiral teeth 36. It will be seen that upon rotation of the gear 25 with the clutch faces 34 and 35 in frictional engagement, a relative movement is caused between the gear 25 and the plate 33, and the hub portion 38 of the clutch plate 33, by reason of the spiral teeth 36, will climb up on the spiral teeth 31 of the sleeve 29, thereby compressing the spring 37 and causing an increased pressure to be applied at the outer engaging portion of the clutch plate 33. Simultaneously the rotational differential between the gears 19 and 24 and 25 causes the spiral member 31 to back out of the clutch plate 33, pushing the gear 25 back against the thrust collar 28. This thrust collar 28 is the fulcrum against which the spiral cam or gear 31 acts to apply additional pressure to force the clutch plate 33 into more positive engagement at surfaces 34 and 35. As long as power is applied, the spiral cam exerts additional pressure to the clutching surfaces. This additional pressure is directly proportional to the load applied. Hence the engagement of the clutch plate 33 with the gear 19 is made more positive, and the inertia within the gear 19 is overcome.

When the electric motor 21 is turned off, the gear 24 tends to stop which puts a drag load on the gear 25, which causes the spiral member 31 to screw back into the clutch plate. Frictional engagement of surfaces 34 and 35 causes the return to normal position of the gear 25 immediately below the spiral gear 24 so that the clutch plate 33 and the gear 19 are disengaged. Likewise upon cessation of rotation of the gear 25, the hub portion 38 of the clutch plate 33 assumes its initial position in abutment with the shoulder 39 of the gear 25. The spring 37 constantly tending to assume its extended position aids in the clutch disengagement.

The spiral toothed clutch innovation herein is a great improvement over the projection and depression operation of my previously patented device due to increased bearing surface of the spiral threads extending around the entire periphery thereof. This eliminates wobble and therefore reduces wear and is conducive to long clutch life.

The foregoing description should suffice to illustrate the many practicable advantages of the clutch of this invention, and it is to be understood that I intend only to be limited within the scope of the appended claims.

What is claimed is:

1. In combination, a driving member, a driven member, a clutch having a central aperture therein positioned intermediate said driving and driven members, said clutch driven by said driving member and adapted to drive said driven member, means for initially shifting said clutch into engagement with said driven member, and secondary means for further shifting said clutch into more positive engagement with said driven member, said secondary means comprising a sleeve projection on said driving member extending through the central aperture in the clutch, spiral teeth on the outer surface of said sleeve projection, spiral teeth on the inner surface of said clutch aperture, and yieldable means interposed between said sleeve projection and said clutch for normally tending to hold said clutch in contact with said driving member and out of contact with said driven member.

2. In combination, a shaft carrying a collar, a spiral gear rotatably mounted on the shaft adjacent the collar and being permitted axial movement away from the collar, means engaging the spiral gear for rotating the same and for moving the same axially away from the collar, a plate positioned at the side of the gear away from the collar and secured to the gear for limited axial movement away from the gear and for limited angular movement with respect to the gear, said gear having an axial projection having external spiral clutch teeth thereon, said plate having internal spiral clutch teeth for engagement with said external spiral clutch teeth, and a member to be driven by engagement of said plate upon axial displacement of said plate.

3. In combination, a shaft carrying a collar, a spiral gear rotatably mounted on the shaft adjacent the collar and being permitted axial movement away from the collar, means engaging the spiral gear for rotating the same and for moving the same axially away from the collar, a plate positioned at the side of the gear away from the collar and secured to the gear for limited axial movement away from the gear and for limited angular movement with respect to the gear, said gear having an axial projection having external spiral teeth thereon, said plate having internal spiral teeth for engagement with said external spiral teeth, the axial projection of said gear having an outwardly extending end flange, yieldable means placed intermediate said end flange and said plate, and a member driven upon axial movement of said plate.

4. In combination, a driving member automatically shiftable laterally, a driven member adjacent said driving member, a clutch plate adapted to frictionally engage said driven member, an external spiral gear projecting axially from said driving member, an internal spiral gear on said clutch plate for engagement with said external spiral gear, yieldable means normally tending to hold said gears in fixed relationship, whereby upon engagement of said clutch plate with said driven member and a slipping thereof the spiral gears will rotate relative to each other causing a compression of said yieldable member and a further axial movement of said clutch member for positive engagement of said clutch plate with said driven member.

5. In combination, a driving member automatically shiftable laterally, a driven member adjacent said driving member, a clutch plate adapted to frictionally engage said driven member, an external spiral gear projecting axially from said driving member, an internal spiral gear on said clutch plate for engagement with said external spiral gear, yieldable means arranged to normally maintain said gears in substantially fixed relationship, whereby upon engagement of said clutch plate with said driven member and a slipping thereof the spiral gears will rotate relative to each other causing a compression of said yieldable member and a further axial movement of said clutch member for positive engagement of said clutch plate with said driven member, and a limiting stop for said shiftable driving member.

WILLIAM H. HARSTICK.